United States Patent [19]
Fantone

[11] Patent Number: 5,833,068
[45] Date of Patent: *Nov. 10, 1998

[54] FLAT BOX SYSTEM WITH MULTIPLE VIEW OPTICS

[75] Inventor: Stephen D. Fantone, Lynnfield, Mass.

[73] Assignee: Insight, Inc., Lynnfield, Mass.

[ * ] Notice: The term of this patent shall not extend beyond the expiration date of Pat. No. 5,588,526.

[21] Appl. No.: 795,659

[22] Filed: Feb. 6, 1997

Related U.S. Application Data

[63] Continuation of Ser. No. 222,632, Apr. 1, 1994, abandoned.

[51] Int. Cl.$^6$ .................................................. B65D 85/57
[52] U.S. Cl. ...................................... 206/459.1; 206/308.1
[58] Field of Search ........................... 206/308.1, 308.3, 206/309, 310, 311, 312, 313, 459.1, 459.5, 45.31, 45.34; 220/602, 662, 665

[56] References Cited

U.S. PATENT DOCUMENTS

| | | | |
|---|---|---|---|
| 3,973,958 | 8/1976 | Bean | 430/50 |
| 4,044,889 | 8/1977 | Orentreich et al. . | |
| 4,420,221 | 12/1983 | Sparks . | |
| 4,475,661 | 10/1984 | Griffin | 215/366 |
| 4,480,893 | 11/1984 | Fanton | 359/465 |
| 4,650,282 | 3/1987 | Lo | 359/462 |
| 4,750,611 | 6/1988 | Morrone | 206/45.13 |
| 4,773,718 | 9/1988 | Weitzen et al. | 359/3 |
| 4,863,026 | 9/1989 | Perkowski . | |
| 4,869,946 | 9/1989 | Clay | 428/167 |
| 5,189,531 | 2/1993 | Palmer et al. . | |
| 5,244,084 | 9/1993 | Chan | 206/309 |
| 5,364,274 | 11/1994 | Sekiguchi | 434/365 |
| 5,588,526 | 12/1996 | Fantone et al. | 206/459.1 |

FOREIGN PATENT DOCUMENTS 2222143   2/1990   United Kingdom .

Primary Examiner—David T. Fidel
Attorney, Agent, or Firm—Francis J. Caufield

[57] ABSTRACT

Optical arrangements are provided by which observers of flat containers or display boxes, such as compact disc (CD) jewel boxes, can be presented with different information about the contents of the box when looking at one of its surfaces from different angular perspectives. Horizontally and vertically oriented lenticulated panels are used in combination with interlaced images to convey the differently coded views without the need for physically manipulating such boxes as in the past to see equivalent information. These arrangements enhance the possibilities for displaying more and different kinds of information on a given box surface area compared with conventional approaches, and as such, enhance the prospects for increasing initial and multiple sales of CD products.

19 Claims, 9 Drawing Sheets

FLAT BOX SYSTEM WITH MULTIPLE VIEW OPTICS

This is a continuation of application Ser. No. 08/222,632 filed on Apr. 1, 1994 now abandoned.

BACKGROUND OF THE INVENTION

1. Field of the Invention

This invention relates generally to flat storage and display boxes and, more particularly, to optical arrangements for providing enhanced viewing of textual, graphic, and/or other symbolically coded information located on the inside of flat, transparent storage and display boxes for compact discs or the like.

2. Description of the Prior Art

Compact discs, which were first developed by Philips and Sony in the early 1980s, are now a well-established form of medium for recording a variety of retrievable information. Their popularity and success stem from their compactness, convenience, competitive cost, and high information storing capacity.

Physically, such discs are thin, flat, circular objects approximately 12 cm in diameter by about 1.2 mm thick. They are provided with a central hole about 18 mm in diameter for purposes of mounting them for rotation in various devices capable of reading and writing information to and from them. Typically, audio, video or other data is recorded in digital form on one surface of the disc with the opposite remaining free for carrying information about the contents of the recorded information.

For enabling writing and recording information, a compact disc (CD) comprises a clear plastic layer over a reflective aluminum surface. Data of whatever type is stored on the disc in binary code; the 'ones' of the code being dents or pits in the plastic surface while the 'zeros' are represented by smooth plastic. When playing the disc, a laser beam scans the disc surface as it rotates and is reflected back only by the 'zero' areas. Reflected light pulses are picked up by a photodetector which converts them into a digital electrical signal that can then be further processed for subsequent use in various playback devices appropriate for the type of information recorded in the disc.

While very popular for audio recording, CDs also can be used for storing video information, which applies the same technology. These have advantages over magnetic tape by virtue of being easier to replicate and randomly access.

CDs are also used to store large amounts of computer information. Here, CD-ROM (compact disc with read-only memory) is the most common format, but other forms of disc are available that allow data to be written on the disc as well as read.

Recent applications for CD use include the photo-CD, which records still images for viewing on a television screen or reproduction as hard copy, and the multimedia CD, which holds pictures, sound, and text on one disc and can play them back through television receiver and hi-fi equipment or appropriately configured computer systems.

While CDs are physically robust because information is digitally encoded and optically read, they obviously are not immune to damage and require protection from mishandling and environmental effects which could destroy or compromise their information bearing surfaces or otherwise threaten their physical integrity.

Consequently, CDs are usually shipped, stored and marketed in correspondingly flat containers referred to as "jewel boxes". Such boxes are generally made of a durable, transparent plastic such as polycarbonate or styrene and have been designed to occupy the minimal amount of space consistent with their protective function. As a result of this, and the fact that CDs can carry so much digitally encoded information, space available on the surfaces of the jewel box for providing information about their contents is at a premium, especially since the practice of packaging CDs with "spaghetti" boxes has been discontinued because of environmental pressures associated with the accumulated waste from the sale of large volumes of CDs.

Since the disappearance of the spaghetti box from the marketplace, the current technique for informing CD users about the contents of recorded CD information is to provide the information in the form of thin paper booklets or sheets that are visible through the flat, transparent panels of a jewel boxes' front cover or base or both. In addition, use is also made of the hinge edge of a box for displaying cryptic information about the title and author or artist of the CD. However, the limited exterior surface area of the conventional CD box in turn limits the amount of information that can be seen through any one surface thus requiring relevant information to be distributed among available surfaces. This forces a prospective buyer to flip through stacks of CDs while scanning the front covers in search of the identity of a particular CD, usually by title and/or artist, that may be of interest and then turning the box around to examine the rear surface for information about the detailed contents. Studies have shown that this results in the loss of multiple, and perhaps primary, sales because the process is time consuming and frustrating for the consumer. Hence, there is a need for a solution to the foregoing problems, and it is a primary object of this invention to provide solutions through the use optical arrangements which enhance the viewing opportunities and amount of information that can be visually detected by a CD user.

While optical approaches have been used in the past for direct magnification of content information about the insides of containers, none have provided more visual access to more information on the same viewable area or, more importantly, different information viewable through the same box surface. For example, British Patent No. GB 2222143 entitled "BOX-LIKE CONTAINER" published on Feb. 28, 1990 discloses the use of a plano-convex, positive cylindrical lens arranged along the hinge edge of a tape cassette or compact disc box for purposes of providing magnification of informational matter carried directly behind it.

U.S. Pat. No. 4,863,026 entitled "STORAGE CASES FOR INFORMATION RECORDING DEVICES" issued on Sep. 5, 1989 discloses a Fresnel lens incorporated in or on the front cover panel of a case for purposes of magnifying information carried on the surface of a program card inserted in the case such that it lies directly beneath the lens. In like manner, U.S. Pat. No. 4,044,889 entitled "COSMETIC CONTAINER INCLUDING INTEGRATED LENS STRUCTURE" issued on Aug. 30, 1977 also shows a Fresnel lens for magnifying tiny underlying information carried on the interior of a cosmetic container.

U.S. Pat. No. 4,863,026 entitled "STORAGE CASES FOR INFORMATION RECORDING DEVICES" issued in the name of Thomas J. Perkowski on Sep. 5, 1989 discloses a Fresnel lens arranged on the front cover of a magnetic tape, video tape, or compact disc storage box for magnifying information located directly behind the front cover at an appropriate distance.

Similarly, U.S. Pat. No. 4,044,889 entitled "COSMETIC CONTAINER INCLUDING INTEGRATED LENS STRUCTURE" issued to Seymour Orentreich et al. on Aug. 30, 1977 describes the use of Fresnel lens structures for magnifying information located on the interior surfaces of cosmetic containers.

In U.S. Pat. No. 5,189,531 entitled "HOLOGRAM PRODUCTION" issued to Charles E. Palmer et al. on Feb. 23, 1993 describes techniques for forming holographic images in cosmetic compact covers or compact audio or video discs or the like.

In view of the known art, there continues to be a demonstrable need for more effective ways of providing significantly improved visual access to flat containers and display boxes for purposes of informing prospective users about the contents of the containers and for making their contents more attractive to induce increased sales. And, it is a primary object of this invention to fulfill this need.

Another object of the present invention is to provide optical arrangements by which the viewable surfaces of flat containers may be exploited to provide views of different information by observing those surfaces from slightly different perspectives.

Yet another object of the present invention is to provide optical arrangements by which encoded information may be provided on a viewable surface.

Yet another object of the present invention is to provide optical viewing arrangements for compact disc containers that can be implemented by relatively minor modification of currently existing molds for fabricating them.

Still another object of the present invention is to provide optical arrangements by which pseudo-dynamic information may be provided to an observer of a flat container box.

Other objects of the invention will be apparent and will appear hereinafter in the following detailed description when read in connection with the drawings.

SUMMARY OF THE INVENTION

Optical arrangements are provided by which observers of flat containers or display boxes, such as compact disc (CD) jewel boxes, can be presented with different information about the contents of the box when looking at one of its surfaces from different angular perspectives. Horizontally and vertically oriented lenticulated panels are used in combination with interlaced images to convey the differently coded views without the need for physically manipulating such boxes as in the past to see equivalent information. These arrangements enhance the possibilities for displaying more and different kinds of information on a given box surface area compared with conventional approaches and, as such, enhance the prospects for increasing initial and multiple sales of CD products.

The interlaced images may be carried on card inserts in optical registration with the lenticulated surfaces, printed on interior surfaces of the box or front surface of a compact disc, or some combination of all possibilities. Whatever the means for presenting the interlaced images to the lenticulated surfaces used in the invention, it is important to align it within tolerable limits with the longitudinal axes of individual lenticules to assure image quality and separation.

DESCRIPTION OF THE DRAWINGS

The structure and operation of the invention, together with other objects and advantages thereof, may best be understood by reading the detailed description in connection with the drawings in which unique reference numerals have been used throughout for each part and wherein.

BACKGROUND

Figure 1:
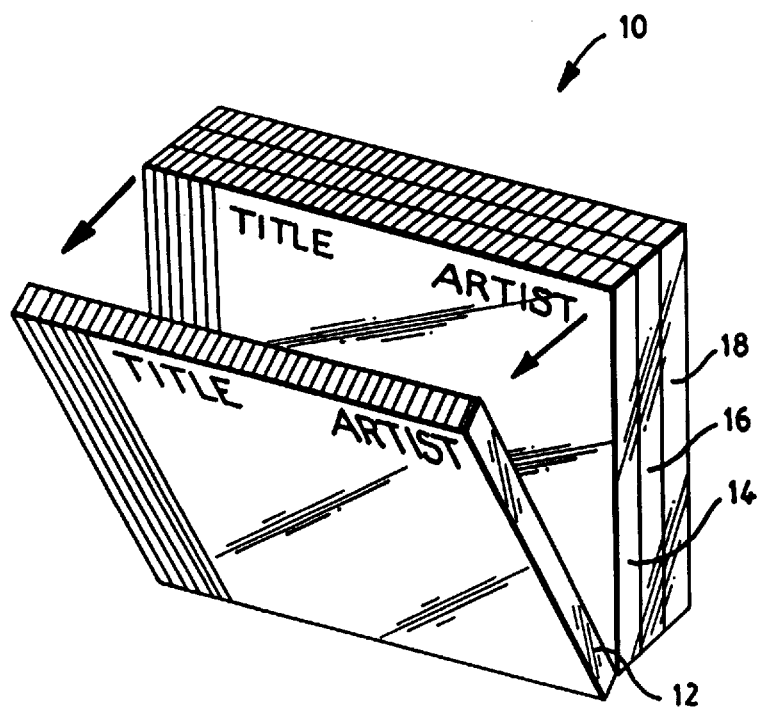
FIG. 1 is a diagrammatic perspective view of a plurality of conventional CD jewel boxes stacked to illustrate the identification problem a consumer usually encounters during the buying process.

Reference is now made to FIG. 1 which shows a stack of flat storage and display box systems for compact discs. The stack is generally designated at 10 and comprises a plurality of individual boxes 12, 14, 16, and 18, which are all identical and of conventional design for storing and displaying compact discs (CDs) such as those for recording and playing back audio information. However, it will be understood that other forms of information such as data, video, multimedia, or graphics could just as easily be recorded on such CDs.

Figure 2:
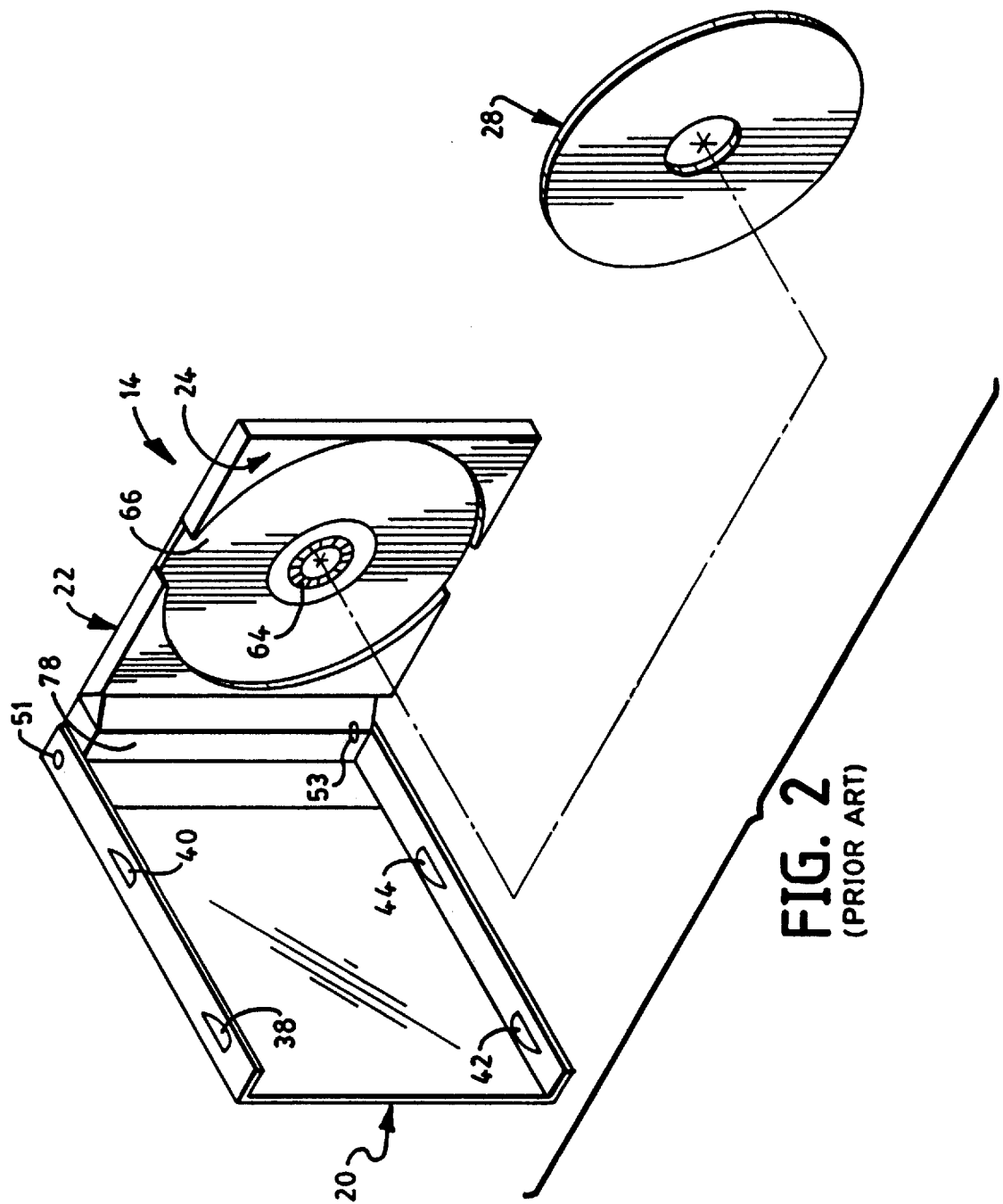
FIG. 2 is a diagrammatic perspective view of a conventional CD jewel box shown in its opened position along with a compact disc.
Figure 3:
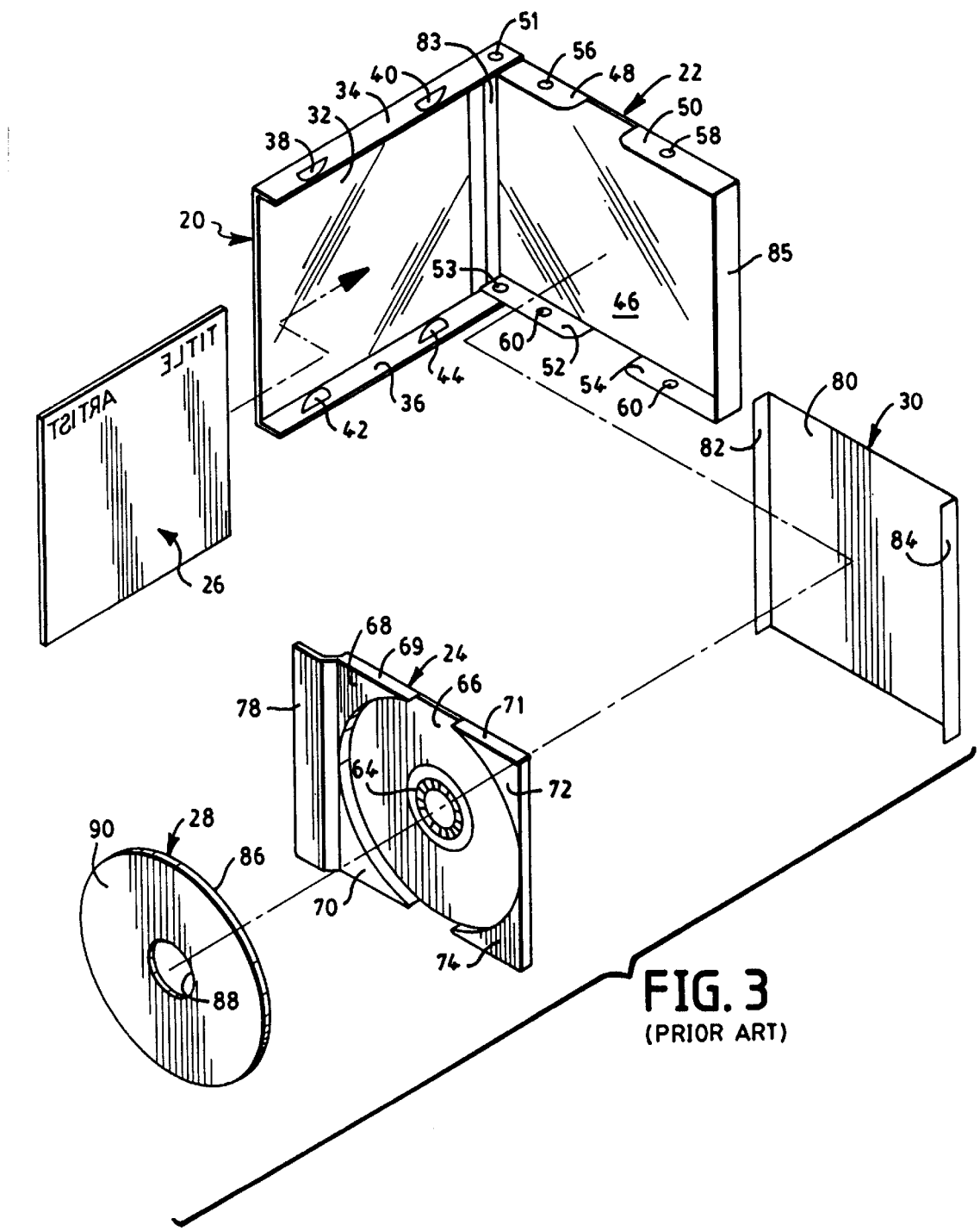
FIG. 3 is an exploded diagrammatic perspective view of a conventional CD jewel box and its various contents including a CD, program insert, and base insert with folded edges.

As best seen in FIGS. 2 and 3, each compact disc box system, considering box 14 as exemplary, comprises the following major components: a front cover 20, a rear base 22, a compact disc carrier or holder 24, an informational booklet 26, which typically carries printed graphical and textual information describing the recorded contents of the box, a compact disc 28 which bears recorded information, and a folded printed insert card 30, which typically carries a shortened textual and graphic description of the contents of the recorded information.

Front cover 20, rear base 22, and disc holder 24 are all molded of a suitable plastic by injection molding with a wall thickness of about 1.2 mm. Overall, each box measures about 142 mm×124 mm×10.4 mm as pictured in FIG. 1 in their closed state.

Typically, front cover 20 and rear base 22 are transparent and molded of styrene or polycarbonate, while disc holder 24 may be made of either transparent or opaque plastic colored as desired.

Referring now to FIG. 3, it can be seen that front cover 20 comprises a front flat panel 32 which has upper and lower raised edges 34 and 36, respectively. Upper raised edge 34 has a pair of spaced apart tabs, 38 and 40, extending outwardly therefrom while lower raised edge 36 is provided with a similar pair of tabs, 42, and 44. Tabs, 38 to 44, are configured and arranged to have corresponding edges of booklet 26 slide underneath them to retain it with its front surface against the rear surface of transparent front cover panel 32. In this manner, information carried on the front page of booklet 26, such as the title and artist's name for an audio disc, can be clearly seen through the front surface of front cover 20.

Rear base 22 also has a transparent flat panel that is designated as 46. Extending outwardly from flat panel 46 are a plurality of raised edge sections 48, 50, 52, and 54. Raised edge sections, 48 and 52, are provided with shallow circularly symmetric holes that cooperate with short complementarily configured posts on the back end of front cover upper and lower edge, 34 and 36, respectively, to provide a pair of pivots, 51 and 53, respectively. Pivots, 51 and 53, permit front cover 20 and rear base 22 to be hingedly connected to one another for movement between open and closed positions.

Folded insert 30 comprises a flat panel section 80 and two raised end edges 82 and 84, all of which can carry printed textual or graphical information. Typically, edges 82 and 84 carry just textual information.

During the assembly of a typical box storage and display system, insert 30 is usually automatically placed in rear base 22 with its information bearing section 80 against the rear surface of transparent flat panel 46 so that it can be readily perceived from the opposite surface by a CD user or customer.

In this connection, the information carried on raised edges 82 and 84 can be seen, respectively, through left and right edges, 83 and 85, respectively, of rear base 22. Left edge 83 in this instance corresponds to the hinge edge of a typical box system.

Compact disc holder 24 functions to retain insert card 30 flush with the rear surface of rear base flat panel 46 and to retain a compact disc in place. For these purposes, disc holder 24 comprises a circular tray section 66 with a flexible hub 64. Extending above circular tray section 66 are four raised edge sections, 68, 70, 72, and 74, located at the four corners of disc holder 24 and shaped to provide a rim for protecting the peripheral edges of a compact disc.

Each raised edge section, 68–72, includes raised dimples (only two shown), such as those at 69 and 71, that are adapted to be snap-fitted with corresponding tab section detent holes, 56–62, in rear base 22. In this manner disc holder 24 snaps into and is retained in rear base 22.

Compact disc 28 is seen to be a flat circular object with a front surface 86, rear surface 90, and central circular mounting hole 88. Front surface 86 carries recorded information with rear surface 90 typically carrying printed information identifying the CD recorded contents by title and artist or the like.

CD 28 is held in place by disc holder 24 with its recorded information bearing surface 86 against the front surface of circular tray 66 so that it is protected against damage. To accomplish this, a user simply aligns flexible hub 64 with circular hole 88 and then pushes against compact disc 28 until it compresses the flexible fingers of hub 64 inwardly. Further inward pressure causes the flexible fingers by design to expand after certain portions clear the thickness of a CD to trap disc 28 in place.

Disc holder 24 also includes a rectangularly shaped raised deck 78 that protrudes through front cover 20 near the hinge edge. The deck is usually provided with surface serrations extending along its longitudinal direction to provide a grip for ease of handling by the user and during manufacture.

In the assembled state as shown in FIG. 1, the information bearing surfaces in such compact disc storage and display box systems can usually only be seen by flipping through them in the manner illustrated. Because of the display arrangements adopted by retailers, it is typically only possible to flip through boxes to scan the information appearing through their front covers to identify their contents. The alternative is to pick the box up and examine all of its sides for the needed information. No information can be seen through either top or bottom edges in the position in which they are usually displayed, and the information that might be seen through the hinge or right edge of a box system is also obscured in this display position.

As will be seen in the following description, the foregoing problems with the conventional CD storage and display box systems are solved with novel optical arrangements for providing a user or customer with more and different opportunities for more easily observing information about the contents of CDs and for enhancing the opportunities for more creative advertising approaches to marketing CDs.

DETAILED DESCRIPTION

Figure 4:
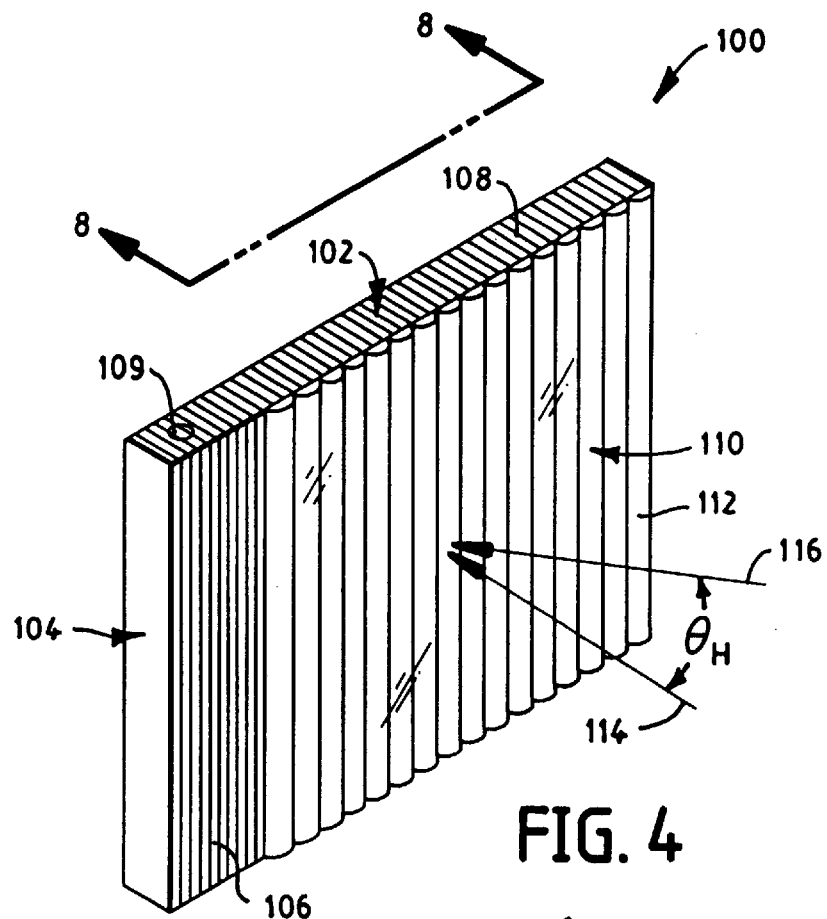
FIG. 4 is a diagrammatic perspective of an inventive compact disc box system having a vertically oriented lenticulated front panel.

Referring now to FIG. 4, there is shown an embodiment of the inventive box system designated generally at 100. Box system 100 comprises a front cover 102 hinged to a base 104 about a pair of pivots (one of which is shown at 109). Inside of box system 100 is a compact disk holder of conventional design and having a grooved deck 106 which is more easily gripped for ease of handling.

Front cover 102 is preferably molded of a durable plastic such as styrene or polycarbonate and includes a transparent, flat, lenticulated panel 110 in which there are formed in its front surface a plurality of vertically oriented adjacent individual lenticules 112 which make up a lenticular array or section and raised side edges such as that shown at 108. While lenticules 112 are shown enlarged many times, it will be appreciated that in practice they are small having spatial frequencies ranging between, for example, 1 to 10 lenticules per millimeter.

Figure 6:
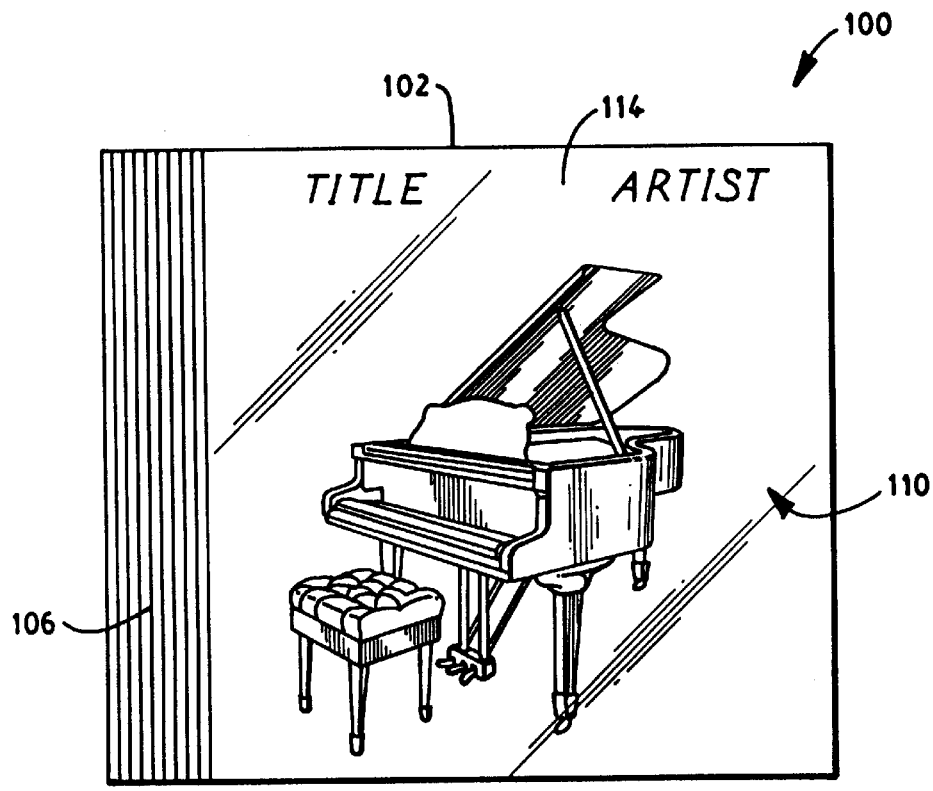
FIG. 6 is a diagrammatic vertical elevational view of the view presented to an observer looking along a first path of observation at the front of the compact disc box system of FIG. 1.
Figure 7:
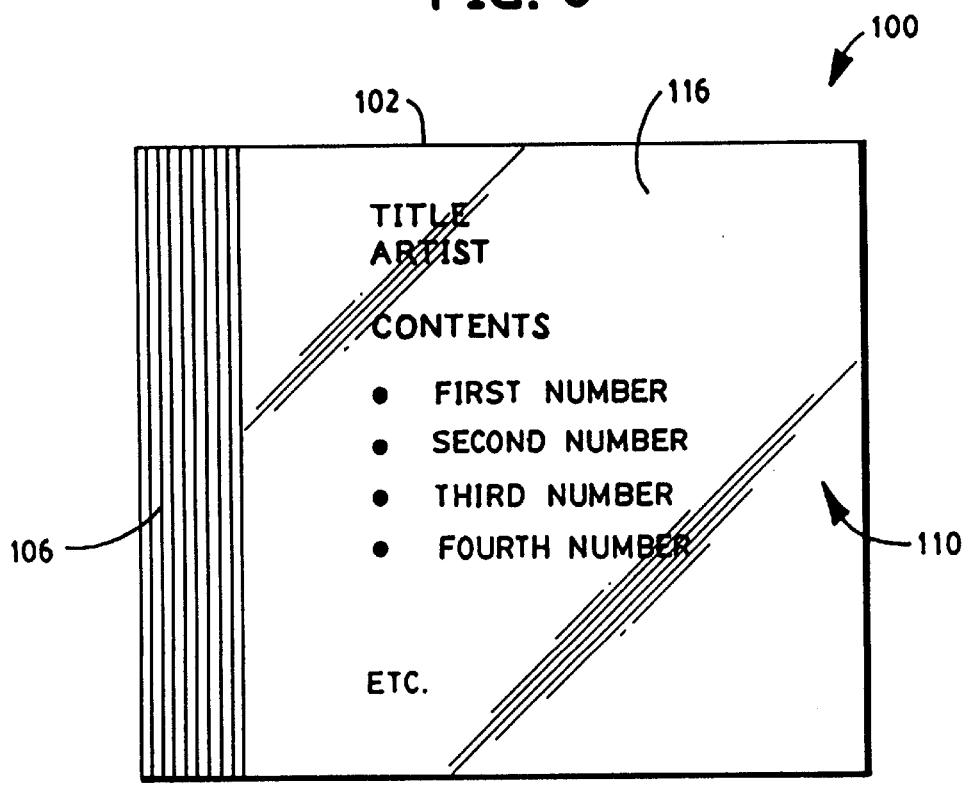
FIG. 7 is a diagrammatic vertical elevational view of the view presented to an observer looking along a second path of observation, angularly separated from the first in the horizontal plane, when looking at the front of the compact disc box system of FIG. 1.

Information in the form of interlaced printed images resides in a plane behind the front cover lenticulated section, and lenticulated front panel 110 operates in a manner to be described to provide an observer with two different images depending on the angle at which front cover 102 is observed. Because of the vertical orientation of lenticules 112, the two available views are separated in angle in a horizontal plane or azimuth perpendicular to front cover 102. In FIG. 4, the arrows designated at 114 and 116 indicate by way of example the angular separation between such views, and FIGS. 6 and 7 show examples of the different type of messages that an observer may see along such paths of observation. As shown in FIG. 6, an observer may be presented with a logo and title and artist information regarding the contents of a CD while viewing along the path designated as 114. Along path 116, slightly to the right of path 114, an observer can see the contents of individual numbers on the CD as in the case of an audio CD.

While two separate views have been illustrated in connection with the description of the embodiment of FIG. 4, it will be appreciated that more than two views are quite feasible, and such views of different information may also be presented to an observer viewing the flat wall of rear cover 104 as well.

Figure 5:
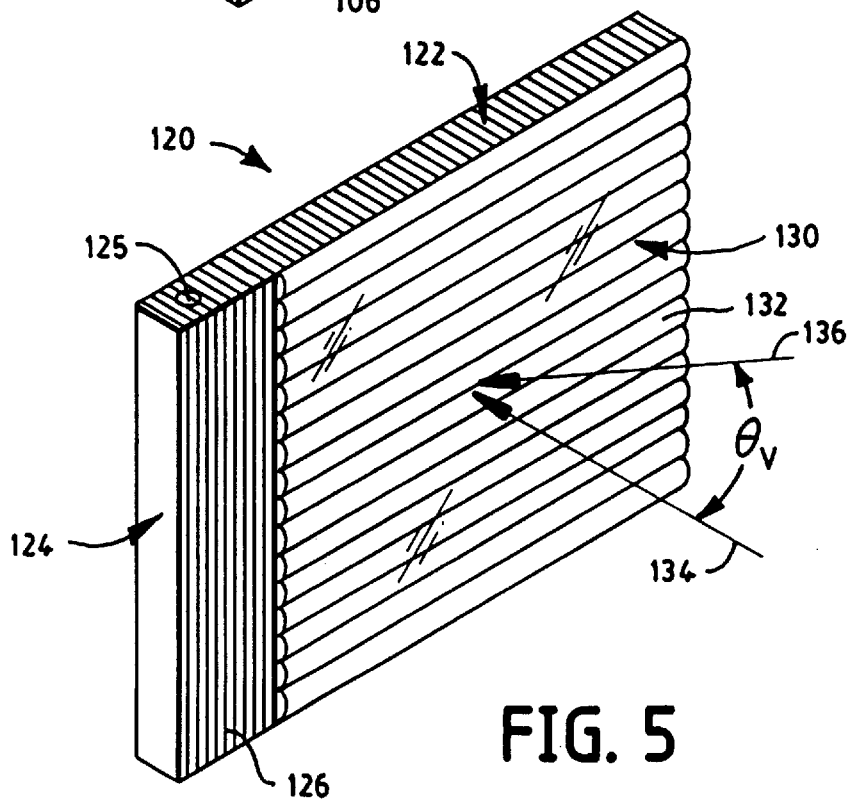
FIG. 5 is diagrammatic perspective of an inventive compact disc box system having a horizontally oriented lenticulated front panel.

In FIG. 5, an alternate embodiment of the invention is presented. Here, a box system 120 comprises a front cover 122 pivotally hinged to a rear base 124 via a pair of pivot points (one shown at 125). Box system 120 also has a conventional disc holder with a deck 126 that protrudes through a cutout in front cover 122. Deck 126 and a front cover side 128 have serrations or grooves as before for improving gripping and handling.

Front cover 122, as before, is injection molded of plastic in a well-known manner and includes a flat, lenticulated front panel 130 having a plurality of horizontally oriented, side-by-side, parallel lenticules 132. Lenticules 132 operate as before to provide two informational views that, in this instance, are angularly separated vertically in a plane or azimuth that is perpendicular to the longitudinal axes of lenticules 132. Here, the views, which may be used to present different observable messages, are designated as 134 and 136, and there information may well be identical to that shown in FIGS. 6 and 7 or something altogether different.

Figure 8:
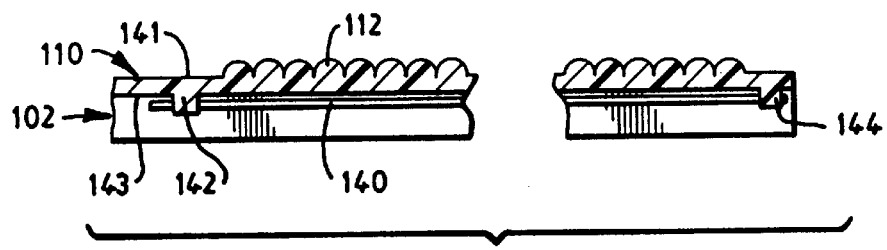
FIG. 8 is an enlarged, diagrammatic, fragmented vertical cross-sectional view of a portion of the box system of FIG. 1 taken generally along line 8—8 therein.

In FIG. 8, there is an enlarged cross-sectional, elevational view of the box system 100 taken generally along line 8—8 of FIG. 4. As can be seen, front flat panel 110 comprises a front surface 141 and rear surface 143. In front surface 141 are formed the plurality of lenticules 112. Each lenticule operates in a well-known manner as a cylindrical lens to form line images in one azimuth corresponding to its longitudinally extending axis.

An information card 140 is provided so that its front surface is at or near contact with rear surface 143. Information card 140 bears an interlaced image, i.e., the images of the various views to be presented to a viewer broken up into tiny adjacent image strips, alternately one and then another from the other view. The interlaced images are placed behind lenticules 112 so that different combinations of them can be seen along the different perspectives; each lenticule 112 providing a view of part of the whole image which collectively are perceived as a synthesized whole by the observers visual system without notice of the lenticules themselves because of their size in relation to the visual acuity of the eye.

The insert or informational card 140 is positioned laterally and vertically through the use of locating pins 142 and 144 which fit into corresponding holes provided in it. Any suitable means such as resilient means may be provided to keep the insert card 140 pressed against rear surface 143 to assure that the printed matter on card 140 is located at the proper distance from the focus of lenticules 112.

Figure 9:
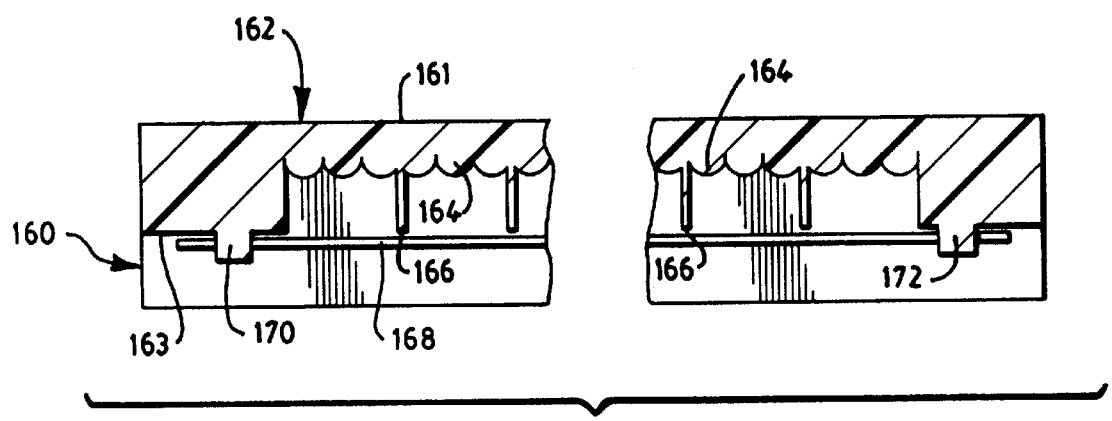
FIG. 9 is an enlarged, diagrammatic, fragmented vertical cross-sectional view of another embodiment of the invention in which the lenticulated surfaces of the front cover are located internal to a box.

FIG. 9 shows an alternate embodiment of the invention where the lenticules may be located on the interior of an inventive box system designated generally at 160. Here, there is a transparent flat panel 162 injection molded with flat exterior surface 161 and a rear interior surface 163. Formed in interior surface 163 are lenticular cylindrical grooves 164 that are separated by small isolation pillars 166 whose bases lie in the plane of surface 163. As shown, grooves 164 are preferably formed in groups, two, three, or more. Isolation pillars 166 operate to prevent cross talk between grooved lenticules 164 and thus keep the interlaced images from intermingling.

An information bearing card 168 is placed against surface 163 and the bottoms of pillars 166 to provide the interlaced image to lenticules 164, and information card 168 is registered with lenticules 164 via a pair of locating pins 170 and 172.

Figure 11:
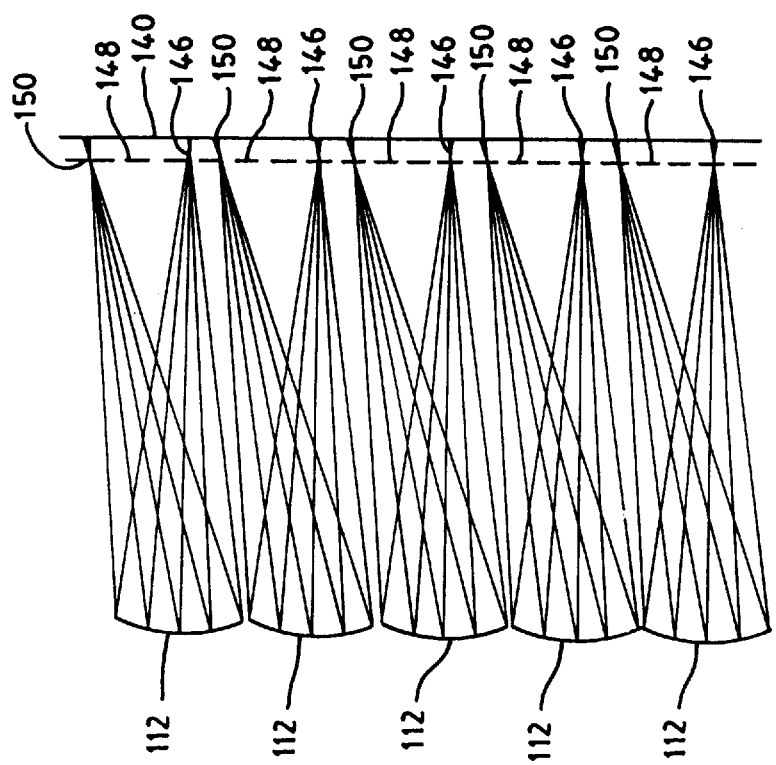
FIGS. 10 and 11 are diagrammatic drawings taken transverse the longitudinal axes of lenticulated panels used in the inventive box systems racing the paths various light rays take in traveling to different segments of interlaced images formed on information bearing cards used in the inventive box systems.
Figure 10:
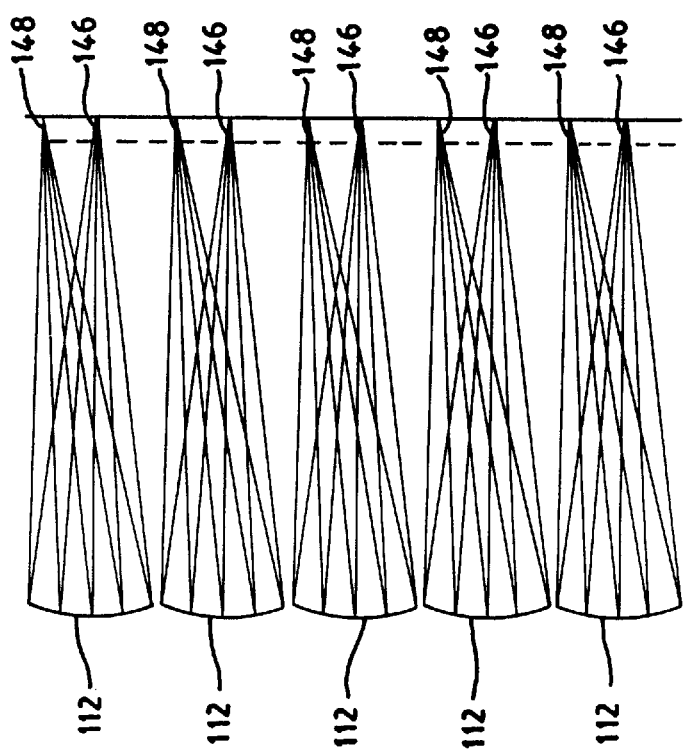

FIGS. 10 and 11 show the principle of operation of the lenticular panels used in the box systems of the invention. Both figures are traces illustrating the paths that certain light rays take in traveling from different portions of the interlaced images used in the invention to provide the different views for a particular lenticule design. Here, the ray traces were done for lenticules 112 that are made of styrene with an index of refraction of 1.59, have a radius of 0.0285 inches, and an apical focal distance of 0.058 inches, i.e., the distance from the front surface on the axis to the optimal focus of a lenticule, here the dashed line which represents the interlaced image. The informational card actually resides behind this location by a distance of 0.003 inches so that there is an air gap of this amount between the front surface of a card (140) and the dashed line.

In FIG. 10, an observer looking straight along the axis of lenticules 112 sees behind each lenticule 112 a different segment of the whole image where each segment is designated at 146. If the observer looks along a line of sight that is at 10°degrees with respect to the axis, image segments designated at 148, which correspond to a different image, can be seen while those designated at 146 cannot.

In FIG. 11, image segments 150 are seen at an angle of observation inclined to the axis at 20°degrees so this may represent yet another message or a repeat of a previous message slightly shifted.

Figure 12:
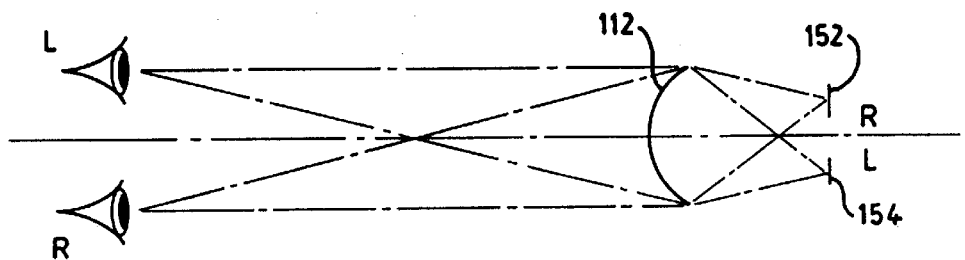
FIG. 12 is a diagrammatic plan view illustrating the principle of operation of the lenticulated surfaces of the invention.

FIG. 12 diagrammatically shows how the interlaced images and lenticules may be used to provide stereo pairs so the view of the box system front cover may be a stereo image. Here, the system is arranged so that the left eye sees a left stereo image segment behind the right side of a lenticule 112 while the right eye sees a right stereo image segment behind the left side of a lenticule 112. The overall effect is for the right and left eyes to have presented to them full left and right stereo image pairs.

Figure 13:
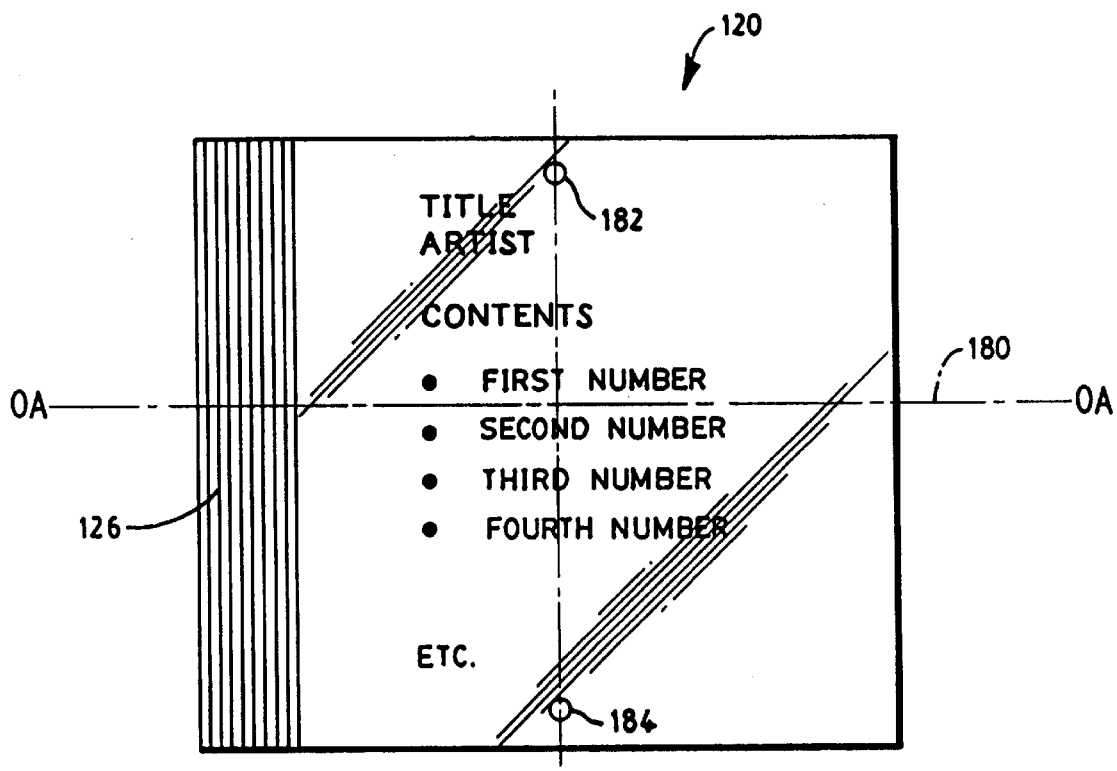
FIG. 13 is a diagrammatic front elevational view of the box system of FIG. 2 shown with additional elements to illustrate the importance of alignment of informational material with the longitudinal axes of the lenticulated surfaces of the invention.

FIG. 13 illustrates the importance of proper alignment of the informational content of the card with the longitudinal axes of the lenticules used in the invention. If the longitudinal axis is taken to correspond to the optical axis, OA, of a lenticule (here designated also as 180), then the registrations pins, such as those designated at 182 and 184, are preferably positioned at right angles to achieve proper alignment. This would also be true if the optical axis of a lenticule ran vertically rather than horizontally as shown.

Figure 14:
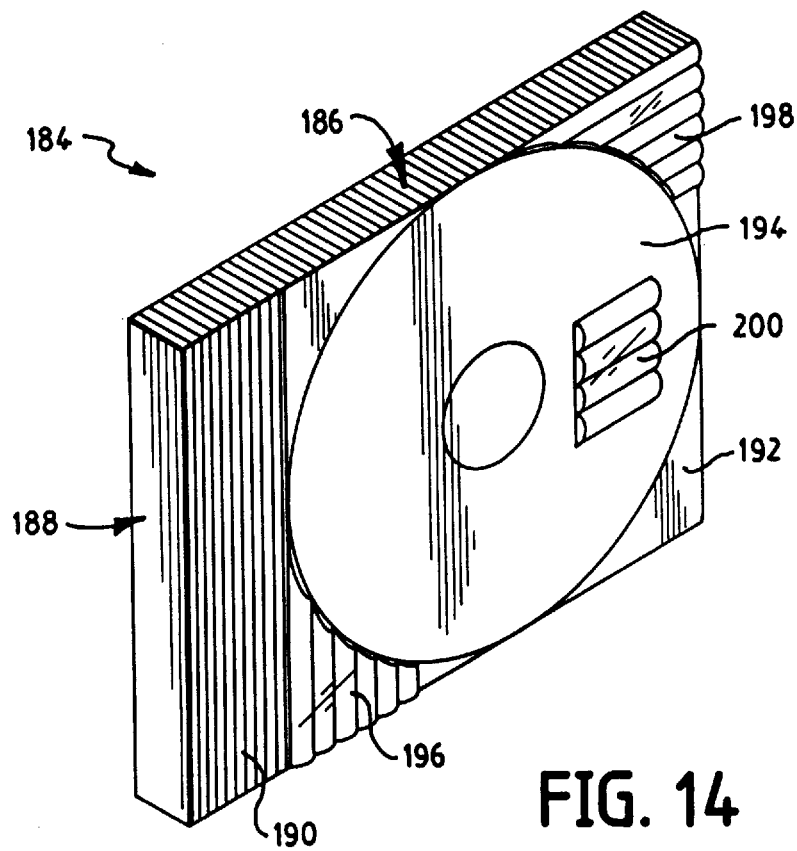
FIG. 14 is a diagrammatic perspective view of another embodiment of the invention showing a plurality of lenticulated surfaces carried on the front cover of an inventive box system to display various information which may be carried on the front surface of a compact disc or disc holder, rather than on a card insert as in other embodiments.

FIG. 14 shows another embodiment of the invention in which a plurality of lenticulated segments are employed on different parts of a front cover to provide different messages or visual effects.

Figure 15:
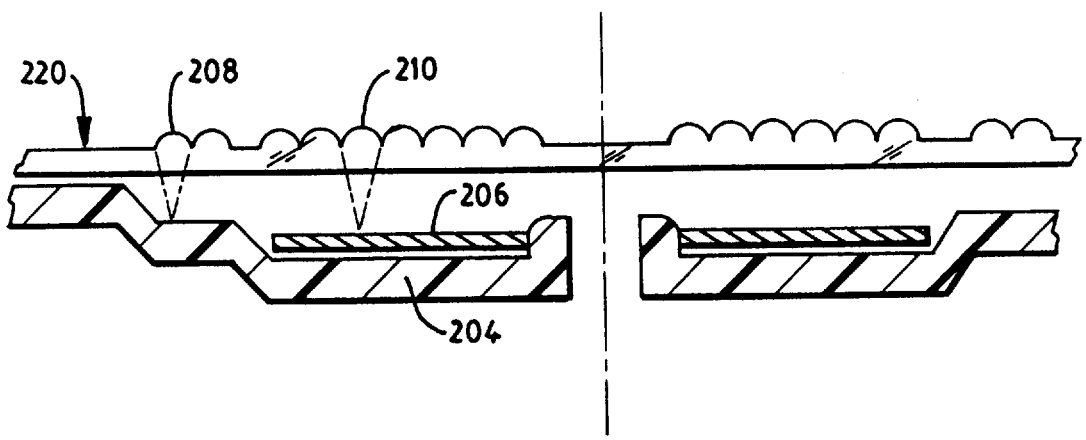
FIG. 15 is a an enlarged, diagrammatic elevational cross-section of a fragment of an alternate embodiment similar in concept to the box system of FIG. 14.

This embodiment is a box system 184 that has a front cover 186, rear base 188, and compact disc holder deck 190 with conventional snap-fit features. Front cover 186 includes a molded flat panel 192 having differently oriented and located lenticulated segments 196, 198, and 200. Segments 198 and 200 are horizontally oriented with segment 196 being vertical. A clear circular segment 194 generally corresponds to the area of a compact disc, except for the presence of lenticulated segment 200. These segments, as well as those previously illustrated, may be made to interact with properly registered informational messages located not just on informational insert cards but on interlaced images placed on different conventionally available CD box structures. FIG. 15, for example, illustrates additional possibilities. Here, a front cover segment 220 has a lenticulated front surface that is provided with different lenticules that have been optically designed to interact with interlaced messages located on different levels of existing CD box structure. Lenticules 208, for example, are provided with a focal length for observing an interlaced message located on an available surface of an otherwise conventional compact disk carrier 204. Lenticules 210 on the other had are structured with a longer focal length to observe an interlaced image located on the front surface of a compact disc 206, which would, of course, have to be properly oriented. The principle illustrated is that the invention may be implemented through the use of a diversity of combinations of lenticulated panel segments with interlaced images on the interior of a box system where those interlaced images may be present as printed cards or be located on other surfaces of existing conventional structure. Interlaced images may, for example, be hot stamped on available surfaces or provided on substrates that are transparent rather than opaque or on adhesive labels or the like, and all of these possibilities are within the scope of the teaching of the invention. All of the possible interlaced images described herein may be fabricated in any well-known manner as, for example, with photographic techniques employing appropriated masks or more recently available computer image manipulation techniques employing computer technology.

It should also be understood that it is not necessary to form the lenticulated wall sections of the invention as unitary structures integrated with structural walls themselves since it is within the teaching of the invention to attach separately formed lenticulated wall sections to otherwise smooth wall sections by using suitable adhesives or other means of attachment. In doing so, locating pins such as those indicated at 142 and 144 in FIG. 8 and at 170 and 172 in FIG. 9 may be used on wall sides of a flat wall section to simultaneously register a separate lenticulated wall section with an information bearing card or the like located at the optimal focal plane of the lenticules employed.

Those skilled in the art may make other changes to the invention without departing from the scope of its teachings. Therefore, it is intended that the embodiments described herein be considered as illustrative and not be construed in a limiting sense.

What is claimed is:

1. A box system for containing at least one flat object and providing visual information about the flat object, said box system comprising:

a multisided flat box comprising a pair of opposed flat walls having interior and exterior surfaces and interconnected by a plurality of shallow side walls to provide an interior chamber for the flat object, said pair of opposed flat walls and said plurality of shallow side walls being joined to releasably receive the flat object, at least one of said pair of opposed flat walls having a transparent lenticulated section comprising a plurality of parallel lenticules having a focal plane optically associated therewith;

at least one removable printed insert bearing at least two interlaced printed images, said removable printed insert being insertable into said interior chamber and located in a plane substantially parallel to and in optical registration with said transparent lenticulated section, said removable printed insert being further located substantially in said focal plane of said transparent lenticulated section to provide different information to an observer looking at said transparent lenticulated section from different angular perspectives, said removeable printed insert and said multisided flat box each including complementary configured locating means for registering said at least two interlaced printed images with respect to said lenticulated section such that said removeable printed insert may be inserted and withdrawn from said box system and then reinserted more than one time while remaining in registration with said lenticulated section after each insertion into said box system.

2. The box system of claim 1 wherein said multisided flat box is molded of transparent plastic and said transparent lenticulated section is integrally molded with one of said pair of opposed flat walls thereof.

3. The box system of claim 1 one wherein said transparent lenticulated section is formed on the exterior surface of one of said opposed flat walls.

4. The box system of claim 1 wherein said transparent lenticulated section is formed on the interior surface of one said opposed flat walls.

5. A box system for containing recorded media and providing visual information about the contents of the recorded media, said box system comprising:

a pair of opposed, spaced apart flat walls having exterior surfaces and at least one major dimension;

a plurality of shallow side walls interconnected between said pair of opposed, spaced apart flat walls and having dimensions that are substantially smaller than said major dimension of said pair of opposed, spaced apart flat walls, at least one of said pair of opposed, spaced apart flat walls having at least one transparent lenticulated section having a focal plane optically associated therewith, said plurality of shallow side walls and said pair of opposed, spaced apart flat walls providing an interior chamber for the recorded media, said pair of opposed, spaced apart flat walls and said plurality of shallow side walls also being interconnected to releasably receive the recorded media; and at least one removable printed insert bearing at least two interlaced printed images, said removable printed insert being insertable into said interior chamber and located in a plane substantially parallel to and in optical registration with said focal plane of said transparent lenticulated section, said printed removable insert being further located substantially in said focal plane of said transparent lenticulated section to provide different information about the recorded media to an observer looking at said transparent lenticulated section from different angular perspectives, said removeable printed insert and at least one of said pair of opposed, spaced apart flat walls and said plurality of shallow side walls each including complementary configured locating means for registering said at least two interlaced printed images with respect to said lenticulated section such that said removeable printed insert may be inserted and withdrawn from said box system and then reinserted more than one time while remaining in registration with lenticulated section after each insertion into said box system.

6. The box system of claim 5 wherein said pair of opposed, spaced apart flat walls and said plurality of shallow side walls are molded of transparent plastic and said transparent lenticulated section is integrally molded with one of said pair of opposed, spaced apart flat walls thereof.

7. The box system of claim 5 wherein said transparent lenticulated section is formed on the exterior surface of one of said pair of opposed, spaced apart flat walls.

8. A box system for containing at least one compact disc, said box system comprising:

a flat base comprising a flat panel having peripheral edges and having shallow raised walls connected around said peripheral edges thereof;

a flat front cover having a surface area and comprising a second flat panel having peripheral edges and also having shallow raised walls connected around said peripheral edges thereof, said flat front cover and said flat base being pivotally connected to one another to form a hinge between them so that said flat base and said flat front cover can be moved between a closed position in which they fit together to define an interior chamber therebetween for releasably receiving a compact disc and an open position in which a compact disc can be inserted or removed from said interior chamber, at least one of said first and second flat panels having a transparent lenticulated section having a focal plane optically associated therewith;

at least one removable printed insert means disposed within said interior chamber for providing information that is in a plane substantially parallel to and in optical registration with said focal plane of said transparent lenticulated section thereof, said removable printed insert including at least two interlaced images located substantially at said focal plant of said transparent lenticulated section to provide different information to an observer looking at said transparent lenticulated section from different angular perspectives, said removeable printed insert and at least one said flat base and flat front cover each including complementary configured locating means for registering said at least two interlace print images with respect to said lenticulated section such that said removable printed insert may be inserted and withdrawn from said box system and then reinserted more than one time while remaining in registration with said lenticulated section after each insertion into said box system.

9. The box system of claim 8 wherein said transparent lenticulated section comprises substantially all of the surface area of said flat front cover.

10. The box system of claim 8 wherein said different angular perspectives are angularly separated along a vertical plane when the lenticules of said transparent lenticulated section are oriented in a horizontal plane.

11. The box system of claim 8 including a plurality of transparent lenticular sections in said flat front cover.

12. The box system of claim 11 wherein said plurality of transparent lenticular sections are oriented along different planes.

13. The box system of claim 8 wherein individual lenticules of said transparent lenticulated section are of different focal length.

14. The box system of claim 8 further including a compact disc holder wherein said compact disc holder and said flat base are complementary configured to snap together and wherein said information providing means is at least in part carried on a surface of said compact disc holder.

15. The box system of claim 8 wherein the lenticules of said transparent lenticulated section have focal lengths for viewing information on a compact disc when said disc is in place inside of said interior chamber and optically aligned with said transparent lenticulated section.

16. The box system of claim 8 wherein said information providing means bears stereo pair images and said transparent lenticulated section operates to provide stereo pairs to an observer looking along the same direction at said lenticulated section.

17. The box system of claim 1 wherein said locating means comprises registration pins fixed in said multisided flat box and corresponding registration holes located in said removeable printed insert.

18. The box system of claim 1 wherein said locating means comprises registration pins fixed in one of said pair of opposed, spaced apart side walls and said plurality of shallow side walls and corresponding registration holes located in said removeable printed insert.

19. The box system of claim 8 wherein said locating means comprises registration pins fixed in one of said flat base and said flat front cover and corresponding registration holes located in said removeable printed insert.

* * * * *